_United States Patent Office_

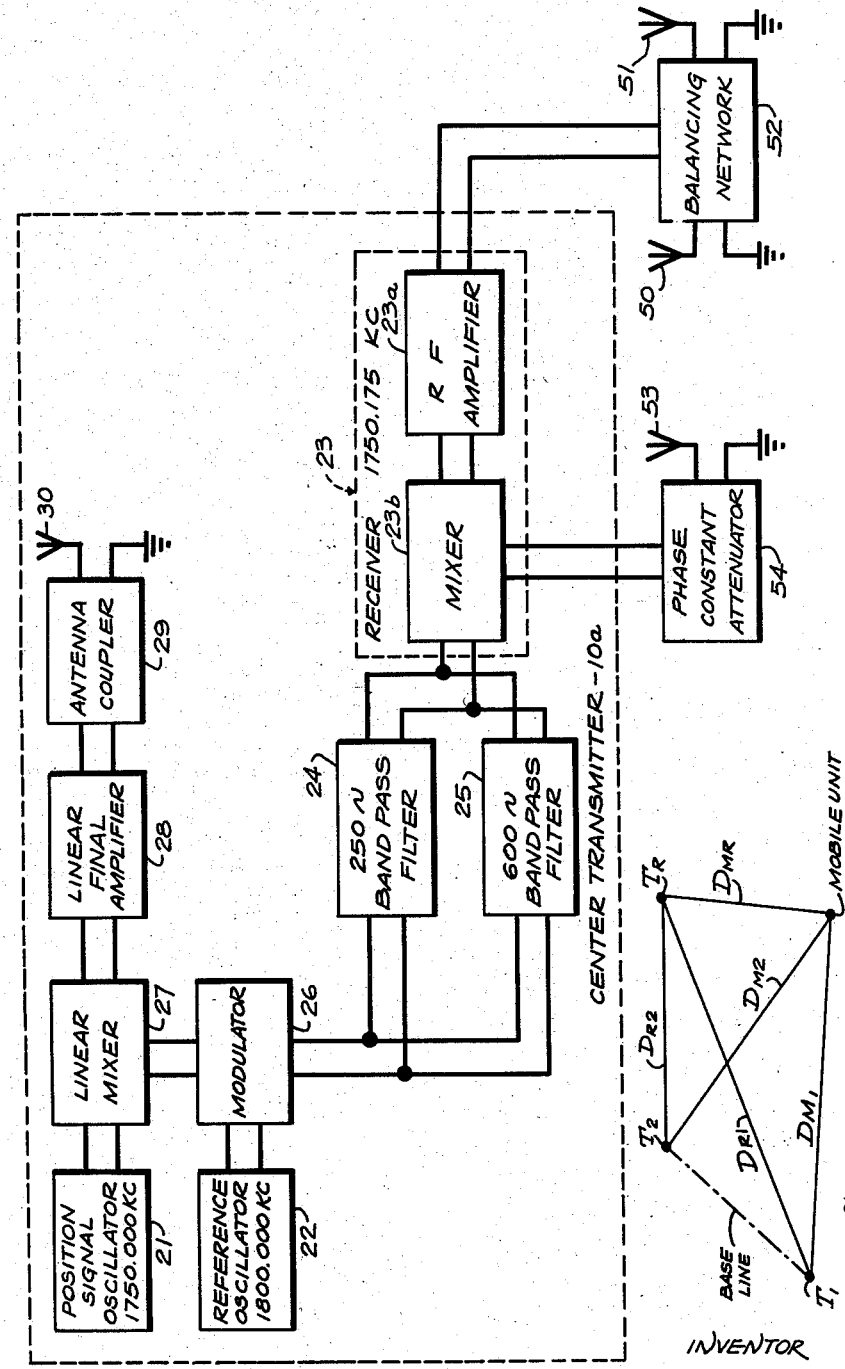

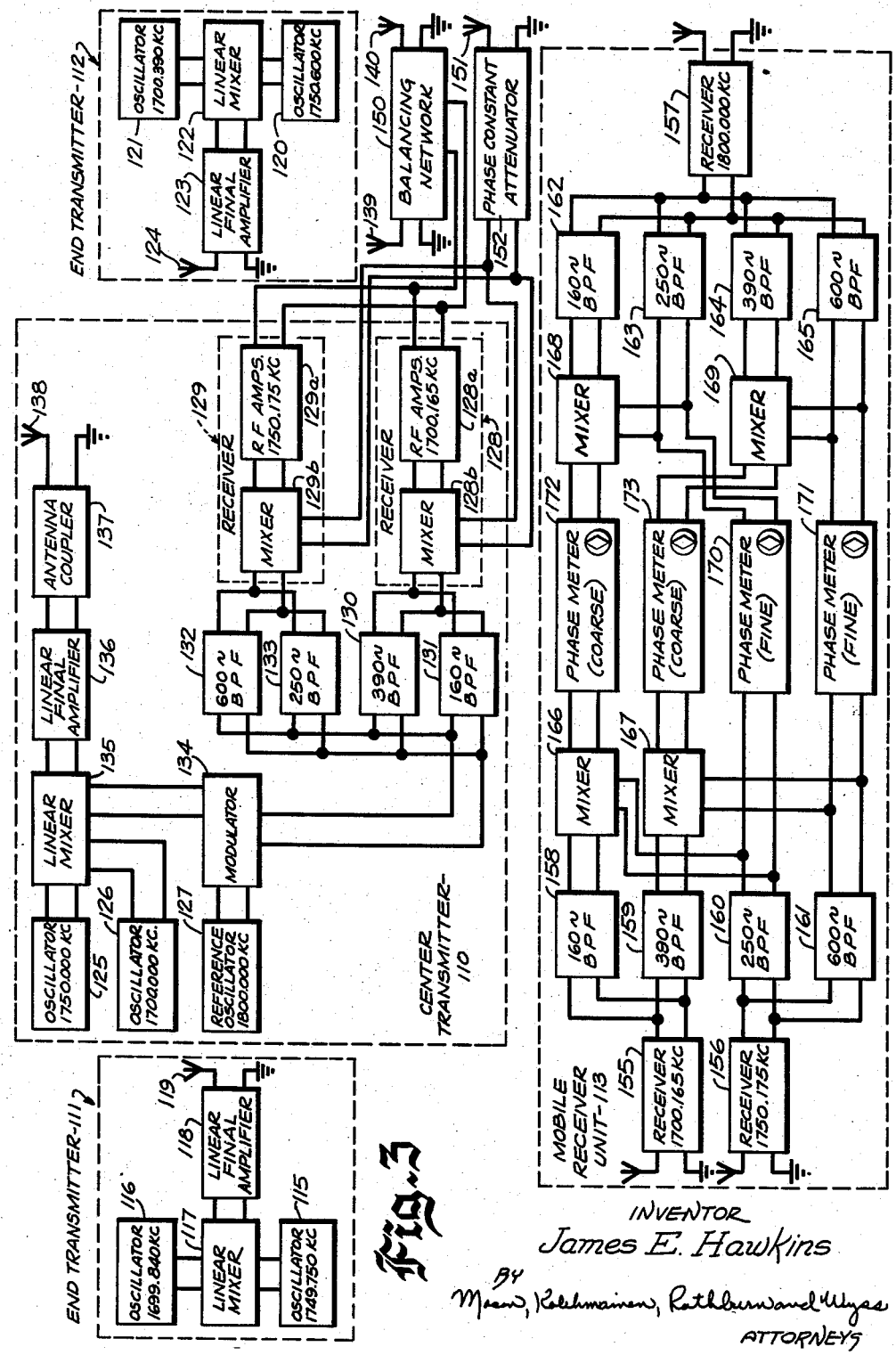

2,890,451
Patented June 9, 1959

2,890,451

RADIO LOCATION SYSTEM

James E. Hawkins, Broken Arrow, Okla., assignor to Seismograph Service Corporation, Tulsa, Okla., a corporation of Delaware Application May 4, 1955, Serial No. 505,875

10 Claims. (Cl. 343—105)

The present invention relates to radio location and distance determining systems, and relates more particularly to improvements in radio position finding systems of the hyperbolic continuous wave type employing phase comparison in pairs of position indicating signals radiated from a plurality of spaced transmitting points to provide one or more indications from which the position of a mobile receiving point relative to the known positions of the transmitting points may be determined with precision accuracy.

In systems of the particular type referred to, the continuous waves radiated from each pair of transmitters bear a phase relationship with changes as a function of changing position of the mobile receiving point relative to the two transmitting points. More specifically, the waves radiated by each pair of transmitting units of the system are characterized by isophase lines which are hyperbolic in contour about the transmitting points as foci. With this system arrangment, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic lines, in order to obtain absolute determination of the position of the receiving point.

In Honore Patent No. 2,148,267, a system is disclosed in which the carrier waves of each pair of transmitters are heterodyned at a fixed link transmitting point, and the difference frequency of the heterodyned waves is modulated as a reference signal on the carrier output of the link transmitter for radiation to the receiving point, where the difference frequency component is detected and phase compared with the difference frequency signal derived by directly heterodyning the transmitted continuous waves at the receiving point. In this manner, phase shifts between the continuous waves radiated from the two transmitters are completely compensated so that the measured phase angle is truly representative of the location at the receiving point between a pair of isophase lines. In Hawkins Patent No. 2,513,316, an improved system is disclosed wherein a single reference transmitter is employed as a link transmitter for radiating all of the reference signals to the mobile receiving point, thereby reducing the number of signal channels required as wall as the amount of equipment necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting pairs of hyperbolic isophase lines, they do not identify the particular pairs of lines to which the indications are related. This means that in operating the system the geographic location of the receiving point must be known at the start of movement of the receiver relative to the transmitting stations and, furthermore, that the successive wave lengths must be counted as the receiving station is moved relative to the gridlike pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In United States Patents Nos. 2,652,558 and 2,652,559, both granted September 15, 1953, to James E. Hawkins, and assigned to the same assignee as the present invention, there are disclosed improved radio location systems of the continuous wave type which are free not only of the phase synchronization difficulties overcome by the Honore and Hawkins patents, but also of ambiguity problems. In the systems of these patents, position indications are obtained having different sensitivities termed phase sensitivities insofar as the spacing of the hyperbolic isophase is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

In all of the above referred to systems difficulties may arise due to the fact that the reference signal transmitter at the link transmitter point should preferably be located at the same point as the heterodyne or position indicating signal transmitter in order to avoid inaccuracies in the position indications provided at the mobile receiving unit, which inaccuracies are discussed more fully below and are termed "third frequency errors." Moreover, the reference signal transmitter and the heterodyne transmitter must both be located closely adjacent the receiver or receivers at the link transmitting point employed for heterodyning the waves radiated from the other transmitting points in order to produce beat frequencies which constitute or may be used to produce the reference signals. Thus, the adjacent receivers must be operated at a frequency separated by only a few hundred cycles or less from the frequency of operation of the heterodyne or position indicating signal transmitter. In addition, these receivers are generally tuned to frequencies separated by only a few kilocycles from the adjacent reference signal transmitter due to the limitations of the frequency channels available in the radio frequency range generally employed in systems of this character. As a consequence, the waves radiated by both the reference signal transmitter and the heterodyne or position indicating signal transmitter may both introduce energy into the receiver circuits to block the receivers or produce cross-modulation in the mixer stages thereof which results in the appearance of objectionable spurious frequencies in the receiver output circuits.

Furthermore, in order to obtain the accuracy inherent in radio location systems of this nature, it is desirable to radiate the signals from the heterodyne or position indicating signal transmitter from a common radiating antenna. This gives rise to the problem of introducing high powered signals of closely related frequencies into the antenna circuit at the link transmitting station without generating strong intermodulation or side band components which not only interfere with the operation of the receiving units of the system, but may result in objectionable interference in frequency bands other than the band in which the two radiated signals fall. It is entirely impractical to employ filters for preventing the above-described interference due to the fact that such filters are generally incapable of handling the large currents and very high voltages applied to the antenna circuits and, in addition, filters having the requisite sharpness or frequency rejection characteristics are extremely difficult to tune and maintain the desired frequency. In the copending application Serial No. 425,271 of William R. Hunsicker, filed April 23, 1954, and assigned to the same assignee as the present invention, there is disclosed an arrangement for effecting the simultaneous radiation of a pair of radio frequency signals from the same transmitting point without spurious generation or radiation of strong side band or intermodulation components. However, the arrangement therein disclosed is not concerned with the problem of radiating both a reference signal and a heterodyne or position indicating signal from the same transmitting station without adversely affecting the receiving equipment operated closely adjacent to the point of emission of these two signals.

It is, therefore, an object of the present invention to provide improved radio location systems of the above indicated type in which both a reference signal transmitter and a heterodyne or position indicating signal transmitter may be operated closely adjacent the receivers at a common transmitting station.

It is a further object of the invention to provide an improved radio location system of the continuous wave type which is free of phase synchronization difficulties of the character mentioned, in which the above-mentioned disadvantages pertaining to ambiguity are entirely obviated, and in which radiation from a common point of signals respectively generated by the reference signal transmitter and by the heterodyne transmitter does not interfere with closely adjacent receivers.

It is another object of the present invention to provide an improved radio location system of the continuous wave type which is free of phase synchronization difficulties in which certain of the position indications obtained have sensitivities insofar as the spacing of the isophase lines is concerned, which will be referred to hereinafter as phase sensitivity, different from the phase sensitivity normally determined by the frequencies of the radiated waves and in which interference of the reference signal transmitter and of the heterodyne transmitter with closely adjacent receiving equipment is eliminated or minimized.

It is a further object of the present invention to provide an improved radio position finding system of the character described in which reference signals may be developed by one or more receivers heterodyning signals received from a closely adjacent station and from a remote station, and in which the resulting beat frequencies may be modulated upon another signal radiated from the adjacent station without interfering with the operation of the heterodyning receivers.

It is likewise an object of the present invention to provide improved transmission systems for use in radio location systems of the above indicated character.

The invention, both as to its organization and its method of operation, together with further objects and advantages thereof, will best be understood by reference to the specification taken in connection with the accompanying drawings in which:

Fig. 2 is a diagrammatic representation of an alternative arrangement of the equipment at the center transmitting station of the system shown in Fig. 1;

Figure 1:
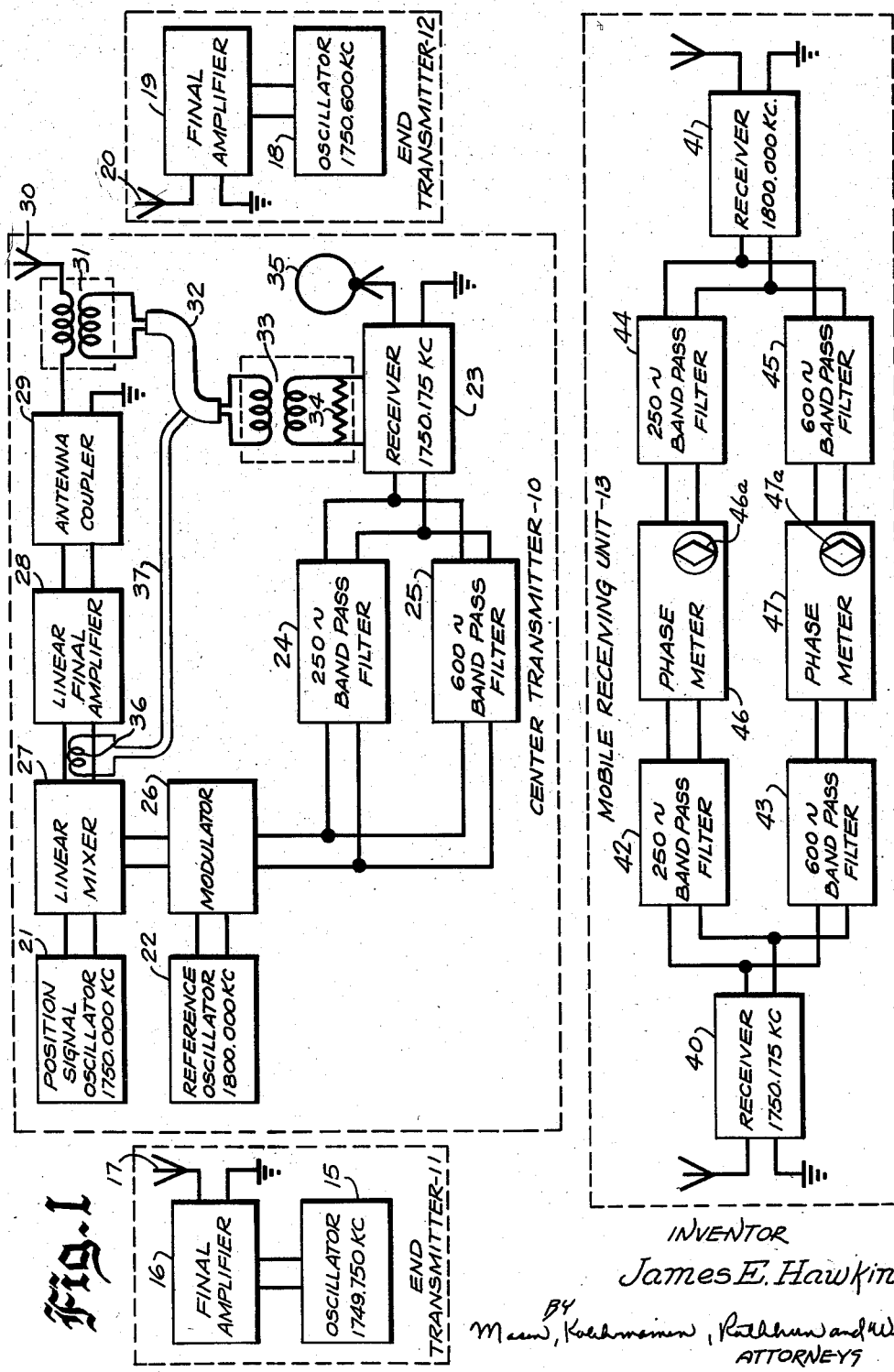
Fig. 1 is a diagrammatic representation of a three-foci position indicating system embodying the present invention for providing position indications at a mobile receiving unit.

Fig. 3 is a diagrammatic representation of still another arrangement of a three-foci position indicating system characterized by the features of the present invention, providing an unambiguous position fix by means of two sets of indications, each set including high and low phase sensitivity indications; and Fig. 4 illustrates the positional arrangement of transmitting and receiving equipment usually employed in radio location systems of the type described above.

Referring now to the drawings and more particularly to Fig. 1 thereof, the invention is there illustrated as embodied in a three-foci hyperbolic continuous wave system of the general type disclosed and claimed in the above-identified Hawkins Patent No. 2,513,316 for providing position information at any number of mobile receiving units 13 which may be carried upon vessels or vehicles operating within the radius of transmission of a plurality of spaced transmitters or transmitting units 10, 11, and 12. These transmitters are preferably spaced apart approximately equal distances and are so positioned that an imaginary base line joining the points of location of the units 10 and 11 is angularly related to a similar imaginary base line joining the points of location of the units 10 and 12. As a consequence, the transmitter or transmitting unit 10 may be considered to be the center transmitter, while the transmitters 11 and 12 may be termed end transmitters.

As is described more fully hereinafter, each of the transmitters 11 and 12 is equipped to radiate continuously a position indicating signal in the form of a radio frequency wave, the waves radiated from these two transmitters differing in frequency by a relatively small audio frequency difference. The center transmitter 10, on the other hand, is equipped to radiate continuously a position indicating signal in the form of an unmodulated carrier wave differing in frequency by a small audio difference from each of the signals radiated by the end transmitters 11 and 12 together with a reference signal in the form of a modulated carrier wave separated in frequency by several kilocycles from the waves radiated by the end transmitters 11 and 12 and from the position indicating signal radiated from the center transmitter 10.

Briefly considered, the equipment provided at the end transmitter 11 comprises an oscillator or signal generator 15 for developing output signals having a frequency of 1749.750 kilocycles together with a final amplifier 16 for amplifying the signals developed by the oscillator to an amplitude sufficient for radiation from a radiating antenna 17. Thus, the end transmitter 11 is effective continuously to radiate a signal having a frequency of 1749.750 kilocycles. Similarly, the equipment provided at the end transmitter 12 comprises an oscillator 18 for developing radio frequency signals having a frequency of 1750.600 kilocycles and a final amplifier 19 for effecting the continuous radiation of these signals from an emitting antenna 20.

The equipment provided at the center transmitter 10 comprises an oscillator 21 for generating heterodyne or position indicating signals having a frequency of 1750.000 kilocycles, a reference oscillator 22 for developing a reference signal carrier wave having a frequency of 1800.000 kilocycles, a receiver 23 responsive to both of the signals radiated by the end transmitters 11 and 12 and to the radio frequency signal generated by the oscillator 21 for developing beat frequency signals in a manner described more fully hereinafter, a pair of band pass filters 24 and 25 for selectively applying certain of the beat frequency signals developed by the receiver 23 to a modulator 26 for modulation upon the carrier wave generated by the reference oscillator 22, and a linear signal transmission channel including a linear mixer 27, a linear final amplifier 28 and an antenna coupler 29 for effecting the simultaneous radiation from an emitting antenna 30 of the position indicating signal developed by the oscillator 21 and the modulated radio frequency signal from the modulator 26.

Referring now to the operation of the system shown in

Fig. 1, it will be apparent that the receiver 23 at the center transmitter 10 receives both of the signals radiated from the end transmitters 11 and 12. A directive antenna system which may include a loop antenna, as indicated at 35, is directed toward the end transmitters 11 and 12 and is nulled upon signals radiated from the radiating antenna 30. Thus, the signals radiated from the latter antenna are effectively eliminated and are not supplied to the input terminals of the receiver 23. In order to supply a portion of the signals generated by the oscillator 21 to the receiver 23 for heterodyning with the waves received from the end transmitters 11 and 12, there is provided a coupling means indicated generally as 31 which may comprise an inductive coupling device for picking off a small portion of the energy fed to the antenna 30 from the antenna coupler 29. This picked off energy is applied through a suitable connector, such as a shielded lead 32, to a radio frequency transformer 33 which introduces excitation signals into the radio frequency stages of the receiver 23. A load resistor 34 may be connected across the secondary winding of the transformer 33 in conventional manner. Thus, the radio frequency stages of the receiver 23 are simultaneously excited with signals received by the loop antenna 35 from the end transmitters 11 and 12 and with the signals picked off by the coupling means 31. The receiver 23 heterodynes these signals in pairs and develops a plurality of beat frequency signals including (a) a 250 cycle signal as a result of heterodyning the 1749.750 kilocycle signal received from the end transmitter 11 with the 1750.000 kilocycle signal developed by the oscillator 21, (b) a 600 cycle beat frequency signal resulting from heterodyning the 1750.600 kilocycle signal received from the end transmitter 12 with the 1750.000 kilocycle signal developed by the oscillator 21, and (c) an 850 cycle beat frequency signal as a result of heterodyning the two signals respectively received from the end transmitters 11 and 12. All of the beat frequency signals developed by the receiver 23 are applied to the input terminals of the band pass filters 24 and 25. The band pass filter 24 rejects all of the developed beat frequency signals except the 250 cycle signal which is passed to the modulator 26. Similarly, the band pass filter 25 rejects all of the developed beat frequency signals except the 600 cycle signal which is also passed to the modulator 26. The latter modulator functions simultaneously to modulate the radio frequency signal developed by the oscillator 22 with the 250 cycle and 650 cycle reference signals from the filters 24 and 25. As previously indicated, the linear signal transmission channel including the mixer 27, the final amplifier 28 and the antenna coupler 29, responds to the modulated signals developed by the modulator 26 and to the position indicating signal developed by the oscillator 21 by supplying both of these signals for simultaneous radiation from the emitting antenna 30.

In order to provide for optimum modulation of the reference signals upon the carrier wave generated by the oscillator 22, the coupling circuit is preferably so adjusted that the signals which it supplies to the receiver 23 are substantially equal in amplitude to the signals supplied to the receiver 23 from the loop antenna 35. In this manner, the receiver 23 is not required to heterodyne excessively strong signals from the center transmitter 10 with much weaker signals from the end transmitters and, as a result, the modulation effected by the modulator 26 is enhanced.

At the mobile receiving unit 13, the signals radiated from the transmitters 10, 11 and 12 are translated into position indications in a manner which will be well understood by those skilled in the art, particularly by those familiar with the above-identified patent to Honore. Specifically, the receiver 40 at the mobile receiving unit 13 accepts the radio frequency signals respectively radiated from the end transmitters 11 and 12 together with the position indicating signal generated by the oscillator 21 and radiated from the center transmitter 10, but rejects the reference signal generated by the oscillator 22 and radiated from the center transmitter 10. Similarly, receiver 41 accepts the modulated carrier wave radiated from the center transmitter 10 and generated by the oscillator 22 but rejects both of the waves radiated from the end transmitters 11 and 12 as well as the position indicating signal generated by the oscillator 21 and radiated from the center transmitter 10. Receiver 41 reproduces the modulation components appearing upon the signal generated by the reference oscillator 22 and applies these modulation signals to the signal input terminals of a pair of band pass filters 44 and 45. The band pass filter 44 rejects the reproduced 600 cycle signal but passes the 250 cycle signal to the right hand set of signal input terminals of a phase indicator or meter 46. The band pass filter 45, on the other hand, rejects the 250 cycle signal and passes the reproduced 600 cycle signal to the right hand set of signal input terminals of a phase meter or indicator 47. The receiver 40 heterodynes the three carrier waves to which it is responsive in pairs and reproduces (a) a 250 cycle beat frequency signal as a result of heterodyning the carrier wave radiated from the end transmitter 12 and the position indicating signal generated by the oscillator 21 and radiated from the center transmitter 10, (b) a 600 cycle beat frequency signal as a result of heterodyning the carrier wave radiated from the end transmitter 12 and the position indicating signal radiated from the center transmitter 10, and (c) an 850 cycle beat frequency signal as a result of heterodyning the two signals radiated from the end transmitters 11 and 12. All three of the beat frequency signals developed by the receiver 40 are applied to the signal input terminals of band pass filters 42 and 43. Both of these filters reject the 850 cycle signal and, as a consequence, this particular signal has no effect on the operation of the mobile receiving unit 13. The band pass filter 42 also rejects the 600 cycle signal but passes the 250 cycle signal to the left hand set of signal input terminals of the phaste meter 46. The latter phase meter measures the phase relationship between the two 250 cycle signals applied to its opposed sets of signal input terminals and provides an indication representative of the location of the mobile receiving unit 13 along a hyperbolic isophase line having foci at the center transmitter 10 and at the end transmitter 11. The band pass filter 43, in addition to rejecting the 850 cycle signal developed at the output terminals of the receiver 40, also rejects the 250 cycle signal but passes the 600 cycle signal to the left hand set of signal input terminals of the phase meter 47. The latter phase meter measures the phase relationship between the two 600 cycle signals applied to its opposed sets of signal input terminals and produces an indication representative of the location of the mobile receiving unit 13 with respect to hyperbolic isophase lines having foci at the center transmitter 10 and at the end transmitter 12. To resolve the ambiguity of the position indications provided by the phase meters 46 and 47, the latter may include rotatable indicating elements 46a and 47a, respectively, suitably connected to counters or integrators not shown in the drawings. These counters function to maintain a record of the number of complete revolutions of the indicating elements 46a and 47a and, hence, serve to count the number of hyperbolic isophase lines traversed by the mobile receiving unit as it is moved relative to the transmitters 10, 11 and 12. Thus, the indications appearing upon the phase meters 46 and 47, together with their associated counting mechanisms, identify a pair of intersecting hyperbolic isophase lines which define the position of the mobile receiving unit 13. To establish a position fix, the phase meter indications are transferred to a chart of the area in which the mobile receiving unit is operating, which chart is provided with hyperbolic isophase lines representative of the phase meter readings at different points occupied by the receiving unit.

If desired, the signals generated by the position indicating signal generator 21 may be supplied to the receiver 23 at the center transmitter by a coupling circuit at the output of the linear mixer 27 instead of picking off a portion of the energy applied to the radiating antenna 30. Specifically, as indicated in Fig. 1, the signal output of the linear mixer 27 may be coupled through a suitable inductive coupling device 36 and through a shielded lead 37 to the radio frequency transformer 33 delivering energy to the radio frequency circuits of the receiver 23. In order to effect optimum modulation of the signals developed by the oscillator 22, the coupling circuit is again preferably adjusted so that the amplitude of the signals which it supplies to the receivers 23 is substantially equal to the amplitude of the signals from the end transmitters 11 and 12 as received by the antenna 35. The use of the pick-off point in advance of the linear final amplifier 28 effectively prevents signals picked up by the transmitting antenna 30 from being applied to the receiver 23 due to the fact that the final amplifier is a unilateral transmission device. However, in instances where the final amplifier 28 tends to introduce phase variations in the signals applied to the receiver 23, it may be desirable to use the pick-off point directly on the antenna 30 as illustrated by the solid line components 31, 32 and 33 as shown in Fig. 1. Thus, the selection of the pickup point may be altered to some extent in accordance with the requirements of the particular installation in order to provide optimum modulation of the signals generated by the oscillator 22.

As will be evident from the above description, a single radiating antenna is provided at each of the signal transmission points where the transmitters 10, 11 and 12 are located. It will be understood that radiation of all signals produced at each transmitter from the same radiating antenna is desirable if the accuracy inherent in phase comparison systems of the character disclosed is to be fully realized. Moreover, the economics of antenna construction, system maintenance and sharp production all dictate that not more than one antenna be used at each of the three signal radiating points of the system.

The described requirement that all signals emanating from the center transmitter 10 be radiated from a single antenna gives rise to the above described problem of impressing two signals of nearly the same frequency on the same antenna circuit without developing strong and highly objectionable intermodulation components between the signals which, unless suppressed, would be radiated by the antenna 30 along with the desired signals. Moreover, since the receiver 23 at the center transmitter 10 is tuned to a frequency which differs by only a few cycles from the frequency of the signal developed by the oscillator 21 and by only a few kilocycles from the signal developed by the reference oscillator 22 it is essential that this receiver not be blocked by relatively strong radiations from the adjacent emitting antenna 30. In addition, since the receiver 23 is adapted to perform the function of heterodyning the signals from both of the end transmitters 11 and 12 with the signal generated by the oscillator 21 and radiated from the center transmitter 10, it is desirable that the strength of the latter signal when applied to the receiver 23 is sufficiently low to avoid the generation of a very low effective modulation. Specifically, if the heterodyne signal supplied to the receiver 23 from the center transmitter 10 is a great deal larger in amplitude than the heterodyne signals received from the end transmitters 11 and 12, the resulting beat frequencies produced at the output of the receiver 23 will be ineffective to provide the desired modulation of the signal generated by the reference oscillator 22.

In view of the foregoing discussion, it will be apparent that the use of the directional receiving antenna system including the loop antenna 35 and the use of the pick-off circuit including elements 31, 32 and 33 solves all of these problems by virtue of the fact that the loop antenna prevents the receiver 23 from being blocked by radiations from the center transmitter 10 while, at the same time, the pick-off circuit applies signals of proper amplitude to the receiver 23.

Before continuing with the description of the operation of the system shown in Fig. 1, it will perhaps be desirable to consider briefly the reasons for radiating both the reference signal and the position indicating signal from the single radiating antenna 30. As previously mentioned, if the reference signals are transmitted from a point remote from the source of the position indicating signal at the transmitter 10 there appear in the phase meter indications provided at the mobile receiving unit 13 certain errors which may be termed "third frequency errors" due to the fact that these errors vary as a function of the difference in frequency between the signals heterodyned by the receiver 23. Specifically, if the reference signals are transmitted from a point remote from both of the base line or heterodyne transmitters comprising the foci of the hyperbolic isophase lines, a system of the type illustrated in Fig. 4 will result wherein the transmitters $T_1$ and $T_2$ represent the heterodyne or position indicating signal transmitting sources disposed at opposite ends of the base line and the transmitter $T_R$ represents the reference signal transmitter positioned at some distance from both of the transmitters $T_1$ and $T_2$. Thus, it will be observed that a two foci, hyperbolic, continuous wave system is diagrammatically illustrated in Fig. 4 for determining the position of a mobile receiving unit. The equipment at the transmitting station $T_R$ is adapted to heterodyne the two position indicating signals respectively radiated from the transmitters $T_1$ and $T_2$ in order to develop the beat frequency therebetween and to modulate said beat frequency upon a carrier wave signal radiated from $T_R$. Thus, as illustrated in Fig. 4 the distance between the reference transmitter $T_R$ and the base line transmitter $T_1$ is represented by $D_{R1}$ and the distance from the reference transmitter to the other base line transmitter $T_2$ is represented as $D_{R2}$. Similarly, the distance of the mobile receiving unit from the reference transmitter $T_R$ is represented by $D_{MR}$, the distance of the mobile unit from the base line station $T_1$ is represented by $D_{M1}$ and the distance of the mobile unit from the other base line station $T_2$ is represented by $T_{M2}$.

At the reference transmitter $T_R$, the beat frequency between the waves received from $T_1$ and $T_2$ will vary as:

$$2\pi f_2\left(t-\frac{D_{R2}}{C}\right)-2\pi f_1\left(t-\frac{D_{R1}}{C}\right) \quad (1)$$

where $f_1$ and $f_2$ are the frequencies of the signals radiated from $T_1$ and $T_2$, respectively, C is the velocity of propagation and $t$ is time. It should also be observed that Equation 1 is expressed solely in terms of the phase or angular relationship of the signals and the amplitudes of these signals have been neglected. Thus, as expressed by Equation 1, the waves from transmitters $T_1$ and $T_2$ arriving at the reference transmitter are delayed by the time required for these signals to traverse the distances from each of the base line stations to the reference transmitter.

At the mobile receiving unit, the reference signal detected from the signal from reference transmitter $T_R$ varies as:

$$2\pi f_2\left(t-\frac{D_{R2}}{C}-\frac{D_{MR}}{C}\right)-2\pi f_1\left(t-\frac{D_{R1}}{C}-\frac{D_{MR}}{C}\right) \quad (2)$$

Thus, the signals arriving at the mobile station from the reference transmitter are delayed by an interval corresponding to the time required for the waves to traverse the distance $D_{RM}$.

The beat frequency between the waves from transmitters $T_1$ and $T_2$ at the mobile receiving unit will vary as:

$$2\pi f_2\left(t-\frac{D_{M2}}{C}\right)-2\pi f_1\left(t-\frac{D_{M1}}{C}\right) \quad (3)$$

Subtracting Equation 2 from Equation 3, as is effectively done by the phase meter at the mobile unit, yields:

$$\frac{2\pi}{C}[f_1(D_{R1}+D_{MR}-D_{M1})-f_2(D_{R2}+D_{MR}-D_{M2})] \quad (4)$$

Equation 4 may be rearranged as follows:

$$\frac{2\pi f_1}{C}[(D_{R1}-D_{R2})+(D_{M2}-D_{M1})]$$
$$-2\pi(f_2-f_1)[D_{R2}+(D_{RM}-D_{R2})] \quad (5)$$

The first term of Equation 5 represents a family of hyperbolic isophase lines having foci at the stations $T_1$ and $T_2$ and spaced apart along the base line interconnecting these stations by one half wave length of $f_1$. The second term of Equation 5 represents a family of hyperbolic isophase lines having foci at the station $T_2$ and at the reference station $T_R$ which are spaced apart along the base line by one half wave length of the "third frequency" $(f_2-f_1)$. The second term of Equation 5 actually distorts the reading of the phase meter at the mobile unit so that the isophase lines corresponding to the meter readings are not actually hyperbolic in contour. This distortion is referred to as a "third frequency error" since it varies as the difference in frequency between the signals radiated from the base line stations $T_1$ and $T_2$. In view of the foregoing discussion, it will be evident that, unless the third frequency error is eliminated, the phase meter readings will deviate from the hyperbolic isophase lines appearing on the chart of the area under survey and an inaccurate position indication will result.

To eliminate this error, the reference signal should be radiated from one of the base line stations. Thus, if the reference signal is radiated from station $T_2$ the factor $D_{R2}$ becomes zero in Equation 5 as does the term $(D_{MR}-D_{R2})$. Accordingly, the second term of Equation 5 is reduced to zero and the indications appearing on the phase meter at the mobile unit are not subject to third frequency error. By a similar reasoning, it can be shown that radiation of the reference signal from the base line station $T_1$ eliminates the third frequency error.

From the foregoing discussion, it is apparent that the radiation of both the reference signal developed by the oscillator 22 and the position indicating signal generated by oscillator 21 from a common antenna, i.e. the antenna 30, at the center transmitter 10 eliminates errors in the position indications provided by the phase meters 46 and 47 at the mobile receiving unit 13. Moreover, the use of the directional antenna system in cooperation with either of the pick-off circuits described above facilitates the radiation of both of these signals from the same antenna without blocking the receiver 23 and without feeding extremely high amplitude signals to this receiver from the antenna 30 to cause a low effective modulation of the reference signals.

An alternative arrangement of the apparatus at the center transmitter 10 is illustrated in Fig. 2 wherein there is disclosed a center transmitter 10a adapted to replace the center transmitter 10 shown in Fig. 1. The center transmitter 10a is identical to the center transmitter 10 except for the elimination of the pick-off loops described above and the use of a directional antenna system of different construction. Specifically, the center transmitter 10a includes a receiver 23 which is identical to the receiver 23 shown in Fig. 1 but which has been shown, in order to facilitate the description, as comprising radio frequency amplifier stages 23a and a mixer stage 23b. Of course, the receiver may further comprise suitable audio amplifiers, automatic volume control circuits, and the like, but, in order to simplify the drawings, these have not been shown. The radio frequency amplifier stages 23a are adapted to be excited from a directive antenna circuit illustrated as comprising a pair of spaced vertical antennas 50 and 51 together with a balancing network 52. The antennas 50 and 51 and the balancing network 52 are of the type disclosed in copending application Serial No. 454,983 of Robert S. Finn, filed September 9, 1954, now Patent No. 2,828,458, issued March 25, 1958, and assigned to the same assignee as the present invention. As described in the above-identified Finn application, the vertical antennas 50 and 51 may be so oriented with respect to the transmitting antenna 30 that the signals radiated by the latter are balanced out and eliminated by the balancing network 52. At the same time, the signals from the end transmitters 11 and 12 will not be eliminated by the balancing network but will instead be passed to the input terminals of the radio frequency amplifier stages 23a. The latter stages function to amplify these input signals and supply the same to the mixer 23b. It should be understood that the vertical antennas 50 and 51 are spaced a relatively short distance from the antenna 30 and are so oriented that they are located approximately equal distances from the latter antenna. In addition to the signals from the radio frequency amplifier stages 23a, the mixer 23b is also excited by the signals from a pickup antenna 53 spaced some distance from the radiating antenna 30. Since the antenna 53 is located relatively close to the radiating antenna 30, it is desirable to decrease the amplitude of this signal before application to the signal input terminals of the mixer 23b and, to this end, there is provided a phase constant attenuator network 54 of conventional construction interposed between the pickup antenna 53 and the mixer 23b. The phase constant attenuator functions to reduce the amplitude of the signals received from the transmitting antenna 30 until they are approximately equal to the signals supplied to the mixer 23b from the amplifier stages 23a as received from the end transmitters 11 and 12. Due to the equality of the input signals to the mixer 23b optimum modulation of the radio frequency signals developed by the reference oscillator 22 is effected.

The mixer 23b functions to heterodyne the signals supplied thereto from the pickup antenna 53 with the signals from the end transmitters 11 and 12 as developed by the spaced vertical antennas 50 and 51. Thus, there appear at the output terminals of the receiver 23 a plurality of beat frequency signals including (a) an 850 cycle signal as a result of heterodyning the two signals received from the end transmitters 11 and 12, (b) a 250 cycle signal as a result of heterodyning the signal from the end transmitter 11 received by the vertical antennas 50 and 51 with the signal developed by the position indicating signal oscillator 21 as received by the pickup antenna 53, and (c) a 600 cycle beat frequency signal as a result of heterodyning the signals from the end transmitter 12 received by the vertical antennas 50 and 51 with the position indicating signal from the oscillator 21 as developed by the pickup antenna 53. The 250 and 600 cycle signals are respectively passed by the filters 24 and 25 to the modulator 26. All of the other beat frequency signals developed by the receiver 23 are rejected by these filters. The modulator 26 imposes both of these audio frequency signals upon the 1800.000 kilocycle wave generated by the oscillator 22 and applies the resulting modulated wave to the linear mixer 27 simultaneously with the application of the 1750.000 kilocycle signal generated by the oscillator 21. The linear mixer 27, the linear final amplifier 28 and the antenna coupler 29 function in the manner described above to effect the simultaneous radiation from the emitting antenna 30 of both of the input signals applied to the mixer 27. At the mobile receiving unit 13 the waves radiated by the center transmitter 10a and by the end transmitters 11 and 12 are translated into the position indications in the manner described above.

An alternative arrangement of the apparatus of the present invention is illustrated in Fig. 3 wherein there is disclosed a system for providing both fine and coarse position indications representative of the location of a mobile receiving unit 113 with respect to spaced transmitters 110, 111 and 112, thereby to resolve ambiguity of the fine position indications. The end transmitter 111 is adapted continuously to radiate a pair of radio frequency signals of different frequency while the end transmitter 112 is adapted continuously to radiate another pair of radio frequency signals which differ in frequency not only from each other but also from each of the waves radiated by the end transmitter 111. The center transmitter 110 is adapted continuously to radiate a pair of unmodulated radio frequency signals separated in frequency from both of the signals radiated from the end transmitter 111 and from both of the signals radiated from the end transmitter 112 together with a carrier wave simultaneously modulated with a plurality of reference signals in the manner described below.

Briefly considered, the equipment provided at the end transmitter 111 comprises an oscillator 115 for generating signals having a frequency of 1749.750 kilocycles, an oscillator 116 for developing signals having a frequency of 1699.840 kilocycles, and a linear signal transmission channel comprising a linear mixer 117 and a linear final amplifier 118 for simultaneously radiating the signals developed by the oscillators 115 and 116 from a radiating antenna 119 without developing undesired intermodulation components between these two signals. Similarly, the equipment provided at the end transmitter 112 comprises an oscillator 120 for generating signals having a frequency of 1750.600 kilocycles, an oscillator 121 for generating signals having a frequency of 1700.390 kilocycles and a linear signal transmission channel comprising a linear mixer 122 and a linear final amplifier 123 for effecting the simultaneous radiation of both of the signals developed by the oscillators 120 and 121 from a radiating antenna 124 without developing intermodulation components.

The equipment provided at center transmitter comprises an oscillator 125 for developing position indicating signals having a frequency of 1750.000 kilocycles, an oscillator 126 for developing position indicating signals having a frequency of 1700.000 kilocycles, a reference oscilltor 127 for developing a carrier wave signal having a frequency of 1800.000 kilocycles, a receiver 128 center tuned to a frequency of 1700.165 in order to accept one of the waves radiated from each of the end transmitters 111 and 112 and to reject the other wave radiated from each of these transmitters, a receiver 129 center tuned to a frequency of 1750.175 kilocycles for receiving the second wave radiated from each of the end transmitters 111 and 112, a pair of band pass filters 130 and 131 for selectively applying certain of the beat frequency signals developed by the receiver 128 to a modulator 134, a pair of band pass filters 132 and 133 for selectively applying certain of the beat frequency signals developed by the receiver 129 to the modulator 134, and a linear signal transmission channel comprising a linear mixer 135, a linear final amplifier 136 and an antenna coupler 137 for effecting the simultaneous radiation from a radiating antenna 138 of both of the signals developed by the oscillators 125 and 126 and the modulated signal from the modulator 134.

In order to prevent blocking of the receivers 128 and 129 at the center transmitter 110, there is also provided a directive antenna system including spaced vertical antennas 139 and 140 and a balancing network 150 for effectively eliminating the signals radiated from the antenna 138 and for passing signals received from the end transmitters 111 and 112 to radio frequency stages 128a and 129a of the receivers 128 and 129, respectively. In order to provide a signal for heterodyning with the signals passed by the directive antenna system to the receivers 128 and 129, there is provided a pickup antenna 151 spaced from the emitting antenna 138 for passing signals received from the latter antenna to the mixer stages 128b and 129b of the receivers 128 and 129, respectively.

Turning now to a description of the operation of the equipment provided at the center transmitter 110, it will be apparent that the directive antenna network, including the vertical antennas 139 and 140 spaced equal distances from the radiating antenna 138, effectively eliminates all of the signals radiated from the center transmitter 110 and applies all of the signals received from the end transmitters 111 and 112 to the radio frequency stages 128a and 129a of the receivers 128 and 129, respectively. The radio frequency stages 128a are sufficiently selective to reject the 1749.750 kilocycle signal radiated from the end transmitter 111 as well as the 1750.600 kilocycle signal radiated from the end transmitter 112. However, the radio frequency stages 128a accept the 1699.840 kilocycle signal radiated from the end transmitter 111 and the 1700.390 kilocycle signal radiated from the end transmitter 112 and apply both of these signals to the mixer 128b. Similarly, the radio frequency stages 129a of the receiver 129 are sufficiently selective to reject the 1699.840 kilocycle signal radiated from the end transmitter 111 and 1700.390 kilocycle signal radiated from the end transmitter 112. The 1749.750 and 1750.600 kilocycle signals respectively radiated from the end transmitters 111 and 112 are applied by the radio frequency amplifiers 129a to the mixer 129b. The signals received by the pickup antenna 151 from the radiating antenna 138 are applied through a phase constant attenuator 152 to a second set of signal input terminals of the mixers 128b and 129b. The amplitude of the signals from the phase constant attenuator is substantially equal to the signals respectively applied to the mixers 128b and 129b from the amplifiers 128a and 129a. The mixer 129b functions to heterodyne in pairs all of the signals supplied thereto from the radio frequency amplifiers 129a and all of the signals supplied from the pickup antenna 151 with the result that a large number of beat frequency signals are developed at the output of this mixer. All of the developed beat frequency signals are rejected by the band pass filters 132 and 133 except the 250 cycle signal resulting from the heterodyning of the 1749.750 kilocycle signal received from the end transmitter 111 and the 1750.000 kilocycle wave generated by the oscillator 125, which 250 cycle signal is passed by the filter 133 to the modulator 134, and the 600 cycle signal resulting from the heterodyning of the 1750.600 kilocycle signal received from the end transmitter 112 with the 1750.000 kilocycle developed by the oscillator 125, which 600 cycle signal is passed by the filter 132 to the modulator 134.

Similarly, the mixer 128b heterodynes in pairs all of the signals supplied thereto from the radio frequency amplifiers 128a and all of the signals received by the pickup antenna 151 with the result that a large number of beat frequency signals are developed at the output of the mixer 128b. All of the developed beat frequency signals are rejected by the filters 130 and 131 except for the 160 cycle signal resulting from heterodyning 1699.840 kilocycle signal from the end transmitter 111 with the 1700.000 kilocycle signal developed by the oscillator 126, and the 390 cycle signal developed as a result of heterodyning the 1700.390 kilocycle signal received from the end transmitter 112 with the 1700.000 kilocycle signal developed by the oscillator 126. The 390 cycle signal is passed by the filter 130 to the modulator 134 while the 160 cycle signal is passed by the filter 131 to the modulator 134. The latter modulator functions to modulate the 1800.000 kilocycle signal generated by the oscillator 127 simultaneously with the four audio frequency signals applied thereto from the filters 130 to 133, inclusive. The modulated signal developed by the mixer 134 is applied to the linear mixer 135 of the linear signal transmission channel simultaneously with the signals developed by the oscillators 125 and 126. The linear signal transmission channel functions in the manner described above to effect the simultaneous radiation of all three of these signals from the emitting antenna 138.

At the mobile receiving unit 113, receiver 157 accepts the modulated carrier wave radiated from the center transmitter 110 and rejects all of the other signals radiated by the center transmitter as well as all of the signals radiated from the end transmitters 111 and 112. Receiver 157 functions to reproduce all four of the modulation components appearing upon the 1800.000 kilocycle carrier wave signal received from the center transmitter 110 and applies the reproduced reference signals to the signal input terminals of a plurality of band pass filters 162, 163, 164 and 165 for separation. The band pass filter 162 functions to reject all of the reproduced reference signals except the 160 cycle signal which is passed to a mixer 168. The band pass filter 163 rejects all of the reproduced modulation signals except the 250 cycle signal which is passed to a second set of signal input terminals of the mixer 168 and is also passed to the right hand set of signal input terminals of a fine phase meter 170. The mixer 168 functions to heterodyne the 160 cycle and 250 cycle signals supplied to its separate sets of signal input terminals and produces a 90 cycle double heterodyne signal for application to the right hand set of signal input terminals of a coarse phase meter 172. The band pass filter 164 rejects all of the reproduced modulation signals except the 390 cycle signal which is passed to the right hand set of signal input terminals of a mixer 169. Finally, the band pass filter 165 rejects all of the reproduced signals except the 600 cycle signal which is passed to the right hand set of signal input terminals of a fine phase meter 171 and to a second set of signal input terminals of the mixer 169. The latter mixer heterodynes the 390 and 600 cycle signals applied to its separate sets of input terminals and produces a 210 cycle double heterodyne signal for application to the right hand set of signal input terminals of a coarse phase meter 173.

Receiver 155 at the mobile receiver unit 113 accepts the 1699.840 kilocycle signal radiated from the end transmitter 116, the 1700.390 kilocycle signal radiated from the end transmitter 111 and the 1700.000 kilocycle signal radiated from the center transmitter 110 but rejects all of the remaining radiated signals. The three accepted signals are heterodyned in pairs to produce at the output terminals of receiver 155 a 160 cycle signal as a result of heterodyning the signals received from the center transmitter 112 and the end transmitter 111, a 390 cycle signal as a result of heterodyning the waves received from the center transmitter 110 and the end transmitter 112 and a 550 cycle signal resulting from heterodyning the two waves received from the end transmitters 111 and 112. The 550 cycle signal is rejected by both of the band pass filters 158 and 159 and, hence, has no effect on the operation of the mobile receiver unit 113. The band pass filter 158 also rejects the developed 390 cycle beat frequency signal but passes the 160 cycle signal to one set of input terminals of a mixer 166. Similarly, the filter 159 rejects the reproduced 160 cycle signal but passes the 390 cycle beat frequency signal to one set of signal input terminals of a mixer 197.

Receiver 156 at the mobile receiver unit 113 accepts the 1749.750 kilocycle signal from the end transmitter 111, the 1750.600 kilocycle signal from the end transmitter 112 and the 1750.000 kilocycle signal from the center transmitter 110 but rejects all of the remaining radiated signals. The receiver 156 heterodynes the three accepted signals in pairs and reproduces a 250 cycle signal as a result of heterodyning the signals received from the center transmitter 110 and the end transmitter 111, a 600 cycle signal as a result of heterodyning the signals from the center transmitter 110 and the end transmitter 112 and an 850 cycle signal as a result of heterodyning the signals received from the end transmitters 111 and 112. The 850 cycle signal is rejected by both of the filters 160 and 161. Filter 160 also rejects the 600 cycle signal but passes the 250 cycle beat frequency signal to the left hand set of signal input terminals of the fine phase meter 170 and to a second set of signal input terminals of the mixer 166. The latter mixer heterodynes the 160 cycle and 250 cycle signals applied to its separate sets of signal input terminals and produces a 90 cycle double heterodyne signal for application to the left hand set of signal input terminals of the coarse phase meter 172. The band pass filter 161 rejects the 250 cycle signal produced by receiver 156 but passes the 600 cycle beat frequency signal to the second set of signal input terminals of the mixer 167 and to the left hand set of signal input terminals of the fine phase meter 171. Mixer 167 thus functions to heterodyne the 390 and 600 cycle signals supplied to its separate sets of signal input terminals and produces a 210 cycle double heterodyne difference frequency signal and applies the same to the left hand set of signal input terminals of the coarse phase meter 173. As is apparent from the foregoing description, the phase meter 170 measures the phase relationship between the two 250 cycle signals applied to its opposed sets of signal input terminals and produces an indication representative of the location of the mobile receiving unit 113 along a hyperbolic line having foci at the center transmitter 110 and at the end transmitter 111. Similarly, the fine phase meter 171 measures the phase relationship between the two 600 cycle signals applied to its opposed sets of signal input terminals and provides a phase indication representative of the location of the mobile receiver unit relative to hyperbolic isophase lines having foci at the center transmitter 110 and at the end transmitter 112. The hyperbolic isophase lines to which the readings appearing upon phase meters 170 and 171 pertain are spaced relatively close together and, hence, these readings are termed the fine or high phase sensitivity indications.

To provide coarse position indications for resolving the ambiguity of the fine indications appearing upon the phase meters 170 and 171, the phase meter 172 measures the phase relationship between the two 90 cycle double heterodyne signals applied to its opposed sets of signal input terminals and produces an indication representative of the location of the mobile receiver unit relative to widely spaced hyperbolic isophase lines having foci at the center transmitter 110 and at the end transmitter 111. Similarly, the phase meter 173 measures the phase relationship between the two 210 cycle double heterodyne signals applied to its opposed sets of signal input terminals and produces an indication representative of the location of the mobile receiver unit 113 relative to widely spaced hyperbolic isophase lines having foci at the center transmitter 110 and at the end transmitter 112. For reasons which will be apparent from an understanding of the difference frequency principle as disclosed and claimed in the above-identified United States Patent No. 2,652,558 of James E. Hawkins, it will be understood that the phase indications provided by the coarse phase meters 172 and 173 possess relatively low phase sensitivities but are nevertheless sufficiently accurate to provide an approximation of the position of the mobile receiver unit in order to identify the particular lanes within which the mobile receiver unit is positioned, a lane being defined as the spacing between the adjacent closely spaced, hyperbolic isophase lines. The indications provided by the fine phase meters 170 and 171 identify a pair of intersecting hyperbolic isophase lines of high phase sensitivity which accurately define the position of the mobile receiver unit within the range of accuracy of the coarse phase meter indications. Thus, it will be apparent that the radio position finding system illustrated in Fig. 3 provides highly accurate, non-ambiguous position indications by effecting the simultaneous radiation of both the reference signals and a pair of position indicating signals from a single radiating antenna 138. Moreover, such radiation is effected without blocking the receivers 128 and 129 and without overdriving these receivers by signals of relatively high amplitude emitted from the antenna 138 which might adversely affect the modulation signals appearing upon the reference signal generated by the oscillator 127.

If desired, the vertical antennas 139 and 140 and the balancing network 150 together with the pickup antenna 151 and the phase constant attenuator 152 may be replaced by a directive antenna system and pick-off circuit of the type illustrated in Fig. 1.

While particular embodiments of the invention have been disclosed, it will be understood, of course, that the invention is not limited thereto since many modifications may be made and it is therefore contemplated by the appended claims to cover any such modifications as fall within the true spirit and scope of the invention.

I claim:

1. In a hyperbolic, continuous wave, radio position finding system for locating the position of a mobile receiving unit, said system being of the type which includes a first transmitting station for radiating a first position indicating signal, second and third spaced apart transmitting stations spaced from said first station for respectively radiating second and third position indicating signals, heterodyning means located at said first station for heterodyning said first, second and third signals to develop a first beat frequency from the first and second signals and to develop a second beat frequency from said fourth signal, means at said first station for developing a carrier wave, means at said first station for modulating said carrier wave with first and second reference signals respectively derived from said first and second beat frequencies, a single emitting antenna at said first station for radiating both the modulated carrier wave and the first signal, and a signal transmission channel for delivering both the modulated carrier wave and the first signal to said antenna; the combination for preventing blocking of said heterodyning means by signals radiated from said antenna which comprises a directive receiving antenna system nulled upon the antenna and directed to the second and third stations for receiving the second and third signals while substantially eliminating both the modulated carrier wave and the first signal, means for supplying the second and third signals received by said antenna system to said heterodyning means, and means coupled to said signal transmission channel for bleeding off a small portion of the signals supplied to said emitting antenna and for supplying said small portion to the heterodyning means simultaneously with the second and third signals in order to develop said first and second beat frequency signals.

2. The combination defined by claim 1 wherein the amplitude of said small portion signals supplied to the heterodyning means is substantially equal to the amplitudes of the second and third signals supplied to the heterodyning means from the receiving antenna system.

3. In a hyperbolic, continuous wave, radio position finding system for locating the position of a mobile receiving unit, said system being of the type which includes a first transmitting station for radiating a first position indicating signal, second and third spaced apart transmitting stations spaced from said first station for respectively radiating second and third position indicating signals, heterodyning means located at said first station for heterodyning said first, second and third signals to develop a first beat frequency from the first and second signals and to develop a second beat frequency from said fourth signal, means at said first station for developing a carrier wave, means at said first station for modulating said carrier wave with first and second reference signals respectively derived from said first and second beat frequencies, and a single emitting antenna at said first station for radiating both the modulated carrier wave and the first signal, and a signal transmission channel for delivering both the modulated carrier wave and the first signal to said antenna; the combination for preventing blocking of said heterodyning means by signals radiated from said antenna which comprises means including a directive receiving antenna system nulled upon the emitting antenna and directed to the second and third stations for receiving the second and third signals while substantially eliminating both the modulated carrier wave and the first signal, means for supplying the second and third signals received by said antenna system to said heterodyning means, and means for supplying only a small portion of the first position indicating signal radiated from said emitting antenna to the heterodyning means simultaneously with the second and third signals in order to develop said first and second beat frequency signals.

4. In a hyperbolic, continuous wave, radio position finding system for locating the position of a mobile receiving unit, said system being of the type which includes a first transmitting station for radiating a first position indicating signal, second and third spaced apart transmitting stations spaced from said first station for respectively radiating second and third position indicating signals, heterodyning means located at said first station for heterodyning said first, second and third signals to develop a first beat frequency from the first and second signals and to develop a second beat frequency from said fourth signal, means at said first station for developing a carrier wave, means at said first station for modulating said carrier wave with first and second reference signals respectively derived from said first and second beat frequencies, and means at said first station for radiating both the modulated carrier wave and the first signal, the combination for preventing blocking of said heterodyning means by signals radiated from said first station which comprises means including a receiving antenna system for receiving the second and third signals while substantially eliminating both the modulated carrier wave and the first signal, means for supplying the second and third signals received by said receiving antenna system to said heterodyning means, and means for supplying only a small portion of the position indicating signal radiated from the first station to the heterodyning means simultaneously with the second and third signals in order to develop said first and second beat frequency signals.

5. The combination defined by claim 4 wherein the amplitude of said small portion signals supplied to the heterodyning means is substantially equal to the amplitudes of the second and third signals supplied to the heterodyning means from the receiving antenna system.

6. In a hyperbolic, continuous wave radio system for determining the location of a mobile receiving unit, the combination of a first transmitting station for radiating a first position indicating signal; a second transmitting station for radiating a second position indicating signal; means at said first station for developing a carrier wave; means located at said first station for heterodyning said first and second signals to develop a beat frequency; means for modulating said carrier wave with a reference signal developed from said beat frequency; a single emitting antenna at said first station for radiating both the modulated carrier wave and the first position indicating signal; a signal transmission channel for delivering the modulated carrier wave and the first position indicating signal to said antenna; and means for preventing blocking of heterodyning means by the signals radiated from said antenna, the last named means comprising a directive receiving antenna system nulled upon the signals radiated from said antenna and directed to the second station in order to receive the second position indicating signal while substantially eliminating both the modulated carrier wave and the first position indicating signal emitted from the antenna, means for supplying the second position indicating signal from the receiving antenna system to the heterodyning means, and means coupled to said signal transmission channel for bleeding off a small portion of signals supplied to said antenna and for supplying said small portion to the heterodyning means simultaneously with the second position indicating signal in order to develop said beat frequency.

7. The combination defined by claim 6 wherein the amplitude of said small portion signals supplied to the heterodyning means is substantially equal to the amplitude of the second signal supplied to the heterodyning means from the receiving antenna system.

8. In a hyperbolic, continuous wave radio system for determining the location of a mobile receiving unit, the combination of a first transmitting station for radiating a first position indicating signal; a second transmitting station for radiating a second position indicating signal; means at said first station for developing a carrier wave; means located at said first station for heterodyning said first and second signals to develop a beat frequency; means for modulating said carirer wave with a reference signal developed from said beat frequency; a single emitting antenna at said first station for radiating both the modulated carrier wave and the first position indicating signal; a signal transmission channel for delivering the modulated carrier wave and the first position indicating signal to said antenna; and means for preventing blocking of the heterodyning means by the signals radiated from said antenna, the last named means comprising a receiving antenna system nulled upon the signals radiated from said antenna and directed to the second station in order to receive the second position indicating signal while substantially eliminating both the modulated carrier wave and the first position indicating signal emitted from the antenna, means for supplying the second position indicating signal from the receiving antenna system to the heterodyning means, and means for supplying only a small portion of the first position indicating signal radiated from said emitting antenna to the heterodyning means simultaneously with the second position indicating signal in order to develop said beat frequency.

9. In a hyperbolic, continuous wave radio system for determining the location of a mobile receiving unit, the combination of a first transmitting station for radiating a first position indicating signal; a second transmitting station for radiating a second position indicating signal; means at said first station for developing a carrier wave; means located at said first station for heterodyning said first and second signals to develop a beat frequency; means for modulating said carrier wave with a reference signal developed from said beat frequency; means for radiating both the modulated carrier wave and the first position indicating signal from said first station; and means for preventing blocking of the heterodyning means by the signals radiated from said first station, the last named means comprising means for receiving the second position indicating signal while substantially eliminating both the modulated carrier wave and the first position indicating signal radiated from the first station, means for supplying the second position indicating signal from the receiving antenna system to the heterodyning means, and means for supplying only a small portion of the first position indicating signal radiated from said first station to the heterodyning means simultaneously with the second position indicating signal in order to develop said beat frequency.

10. The combination defined by claim 9 wherein the amplitude of said small portion signals supplied to the heterodyning means is substantially equal to the amplitude of the second position indicating signal supplied to the heterodyning means from the receiving antenna system.

References Cited in the file of this patent
UNITED STATES PATENTS

| | | |
|---|---|---|
| 2,085,424 | Goddard | June 29, 1937 |
| 2,103,357 | Gerhard | Dec. 28, 1937 |
| 2,147,810 | Alford | Feb. 21, 1939 |
| 2,462,764 | O'Brien | Feb. 22, 1949 |
| 2,652,558 | Hawkins | Sept. 15, 1953 |